J. WILKIE.
Machines for Bluestoning Seed-Grain
No. 149,820. Patented April 14, 1874.
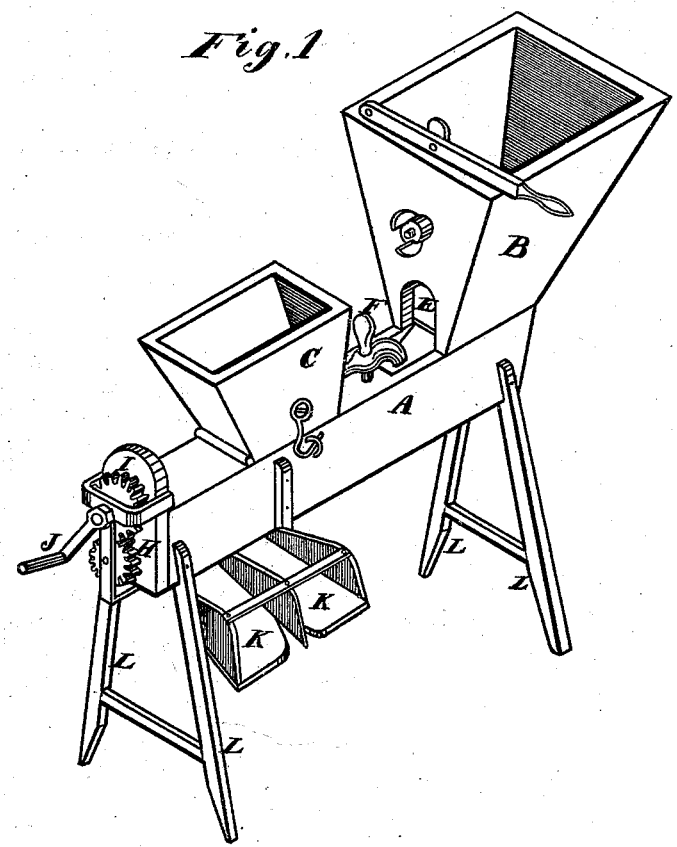
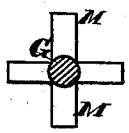
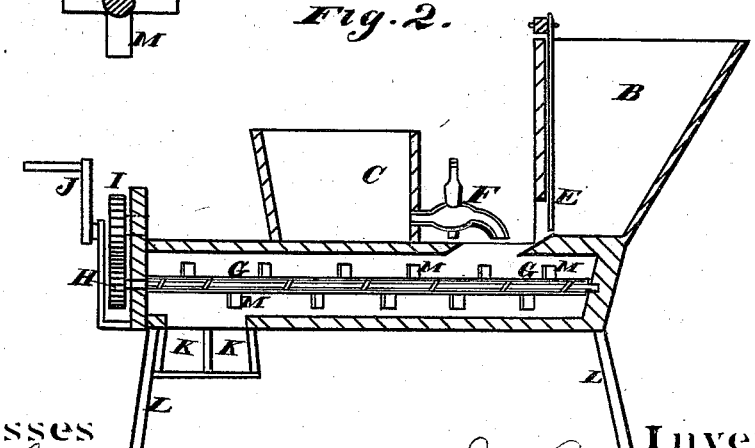
Witnesses
John L. Boone
C. M. Richardson
Inventor
John Wilkie
by Dewey & Co
Attys

UNITED STATES PATENT OFFICE.

JOHN WILKIE, OF YUBA CITY, CALIFORNIA.

IMPROVEMENT IN MACHINES FOR BLUESTONING SEED-GRAIN.

Specification forming part of Letters Patent No. 149,820, dated April 14, 1874; application filed March 3, 1874.

*To all whom it may concern:*

Be it known that I, JOHN WILKIE, of Yuba City, Sutter county, State of California, have invented a Machine for Bluestoning Seed-Grain; and I do hereby declare the following description and accompanying drawings are sufficient to enable any person skilled in the art or science to which it most nearly appertains to make and use my said invention without further invention or experiment.

My invention relates to an improved apparatus for the purpose of bluestoning or saturating seed-grain with a solution of sulphate of copper, and, by this means, destroying any germs of disease, and thus preparing it for sowing.

Referring to the accompanying drawings for a more complete explanation of my invention, Figure 1 is a perspective view of my machine. Fig. 2 is a longitudinal section.

A is a horizontal box, of sufficient length, and having the seed-hopper B upon one end, and the solution-tank C next to it. The bottom of the seed-hopper is made slightly inclined toward the discharge-spout D, and is provided with a regulating-gate, E. An opening is made in the box A in a line with the spout D, and through this the seed passes into the box. The solution-tank has a cock, F, which discharges into the same opening along with the seed. Within the box A is a longitudinal shaft, G. Gear-wheels H I, at one end of the box, serve to give motion to the shaft, either by means of the crank J or by other power. Upon the shaft G, I form a combined stirrer and carrier, which is in the form of a screw. I prefer to construct the screw in the form of short projecting arms M, which are set into the shaft at an angle, as shown. These arms serve as stirrers, and each one thoroughly mixes the seed and solution, and, at the same time, forces the mass forward, so that it will be taken up by the next stirrers. The discharge-spout K is made as shown, and is placed at the end of the box A farthest from the feed-hopper B. The whole machine is set upon legs L, of suitable height, and is easily made, and effective in its operation.

Having thus described my invention, what I claim, and desire to secure by Letters Patent, is—

In combination with the box A, with its mixing and carrying device, the seed-hopper B, with its regulating-gate E, and the solution-tank C, arranged to discharge into the box A through the same opening, substantially as herein described.

In witness whereof I hereunto set my hand and seal.

JOHN WILKIE. [L. S.]

Witnesses:
    J. R. GARRETT,
    GEO. W. ELDER.